US009662771B2

(12) United States Patent
Chen

(10) Patent No.: US 9,662,771 B2
(45) Date of Patent: May 30, 2017

(54) FIXING FIXTURE

(71) Applicant: Wistron Corporation, New Taipei (TW)

(72) Inventor: Shelley Chen, New Taipei (TW)

(73) Assignee: Wistron Corporation, New Taipei (TW)

( * ) Notice: Subject to any disclaimer, the term of this patent is extended or adjusted under 35 U.S.C. 154(b) by 604 days.

(21) Appl. No.: 13/912,205

(22) Filed: Jun. 7, 2013

(65) Prior Publication Data

US 2014/0319751 A1 Oct. 30, 2014

(30) Foreign Application Priority Data

Apr. 27, 2013 (CN) .......................... 2013 1 0153260

(51) Int. Cl.
*B23P 11/00* (2006.01)
*B25B 11/00* (2006.01)
*B25B 5/04* (2006.01)

(52) U.S. Cl.
CPC ................ *B25B 11/00* (2013.01); *B25B 5/04* (2013.01)

(58) Field of Classification Search
CPC ........... B25B 1/00; B25B 1/20; B25B 1/2484; B25B 5/02
See application file for complete search history.

(56) References Cited

U.S. PATENT DOCUMENTS 4,696,449 A 9/1987 Woo et al.
4,757,609 A * 7/1988 Sawdon ............... B21D 39/031 29/243.519
5,267,383 A * 12/1993 Sawdon ............... B21D 39/031 29/243.5
5,315,743 A * 5/1994 Schleicher ........... B21D 39/031 29/243.5

(Continued)

FOREIGN PATENT DOCUMENTS

CN 101859167 10/2010
TW I288211 10/2007

OTHER PUBLICATIONS

"Office Action of Taiwan Counterpart Application," issued on Nov. 10, 2014, with English translation thereof, p. 1-p. 15.

(Continued)

*Primary Examiner* — Lee D Wilson
(74) *Attorney, Agent, or Firm* — Jianq Chyun IP Office

(57) ABSTRACT

A fixing fixture adapted to fix an assembling component is provided. The fixing fixture includes a base and at least one positioning component. The positioning component is pivoted with the base and has a supporting portion and a positioning portion. When the positioning component is located at a first position, the assembling component is adapted to push the supporting portion to drive the positioning component to rotate to a second position, such that the positioning portion is closely pressed against the assembling component. When the positioning component is located at the second position and the positioning portion is closely (Continued)

100 pressed against the assembling component, a fastening component is adapted to rotate along an axis to be fastened onto the assembling component, and the positioning portion stops the assembling component from rotating along the axis with the fastening component.

11 Claims, 5 Drawing Sheets

(56) References Cited

U.S. PATENT DOCUMENTS

| | | | | |
|---|---|---|---|---|
| 5,666,709 | A * | 9/1997 | Suzuki | A63H 27/10<br>29/235 |
| 7,322,086 | B2 * | 1/2008 | Humpert | B23P 19/062<br>29/21.1 |
| 2014/0319751 | A1 * | 10/2014 | Chen | B25B 11/00<br>269/133 |

OTHER PUBLICATIONS

"Office Action of China Counterpart Application" with partial English translation, issued on Jun. 2, 2016, p. 1-p. 9.

* cited by examiner

FIXING FIXTURE

CROSS-REFERENCE TO RELATED APPLICATION

This application claims the priority benefit of China application serial no. 201310153260.8, filed on Apr. 27, 2013. The entirety of the above-mentioned patent application is hereby incorporated by reference herein and made a part of this specification.

BACKGROUND OF THE INVENTION

1. Field of the Invention

The present invention generally relates to a fixing fixture, in particular, to a fixing fixture adapted to prevent an assembling component from rotating.

2. Description of Related Art

Following the development of technology, various electronic products are gradually popularized in the consumer market. The electronic product mostly has circuit board therein, so as to control the operation of the electronic product by circuits and various electronic elements on the circuit board.

Generally, assembling components have to be disposed on the circuit board, so as to assemble the electronic elements onto the circuit board by the assembling components. For example, the assembling components could be fastened to the circuit board by fastening components (such as nuts). During the process of fastening the assembling component by the fastening component, if the assembling component is unable to be fixed firmly, then the assembling component is probably rotated with the fastening component and the fastening of the assembling component can not be completed successfully.

SUMMARY OF THE INVENTION

Accordingly, the present invention is directed to a fixing fixture, and the fixing fixture is adapted to prevent an assembling component from rotating with a fastening component.

In an embodiment of the invention, a fixing fixture adapted to fix an assembling component is provided. The fixing fixture includes a base and at least one positioning component. The positioning component is pivoted with the base and has a supporting portion and a positioning portion. When the positioning component is located at a first position, the assembling component is adapted to push the supporting portion to drive the positioning component to rotate to a second position, such that the positioning portion is closely pressed against the assembling component. When the positioning component is located at the second position and the positioning portion is closely pressed against the assembling component, a fastening component is adapted to rotate along an axis to be fastened onto the assembling component, and the positioning portion stops the assembling component from rotating along the axis with the fastening component.

According to one embodiment of the present invention, the assembling component has at least one interfering surface, the interfering surface is parallel to the axis, and the positioning portion is adapted to closely pressed against the interfering surface to stop the assembling component from rotating along the axis.

According to one embodiment of the present invention, the assembling component includes a main body, a first end portion and a second end portion, the first end portion and the second end portion are connected to two opposite ends of the main body respectively, the first end portion is adapted to lean against the supporting portion, the positioning portion is adapted to be closely pressed against the main body, and the fastening component is adapted to be fastened to the second end portion.

According to one embodiment of the present invention, a width of the first end portion is larger than a width of the main body, and when the positioning portion is closely pressed against the main body, a part of the first end portion is located between the supporting portion and the positioning portion.

According to one embodiment of the present invention, when the part of the first end portion is located between the supporting portion and the positioning portion, the assembling component is adapted to receive a force to drive the first end portion to move away from the supporting portion and push the positioning portion, such that the positioning component rotates from the second position to the first position.

According to one embodiment of the present invention, the positioning portion has a guiding slope, and the first end portion is adapted to push the guiding slope to drive the positioning component to rotate from the second position to the first position.

According to one embodiment of the present invention, the amount of the at least one positioning component is two, and when the assembling component leans against the supporting portion, the two positioning portions are located at two opposite sides of the assembling component respectively.

According to one embodiment of the present invention, when each of the positioning components is located at the first position, a distance between the two positioning portions is larger than a width of the assembling component.

According to one embodiment of the present invention, a length of the positioning portion is smaller than a length of the supporting portion.

According to one embodiment of the present invention, the fixing fixture further includes at least one axle, wherein the positioning component is pivoted with the base through the axle.

According to one embodiment of the present invention, the positioning component further includes a connecting portion, the connecting portion is connected between the supporting portion and the positioning portion, and the axle is located at a border between the connecting portion and the supporting portion.

In view of the foregoing, when the assembling component is placed on the supporting portion of the positioning component of the present invention, the positioning component will rotate from the first position to the second position due to the assembling component pressing down the supporting portion, such that the positioning portion of the positioning component is closely pressed against the assembling component to stop the assembling component from rotating. Thus, when a user is fastening the assembling component by the fastening component, the assembling component is prevented from rotating with the fastening component and the fastening of the assembling component can be completed successfully. As described above, the positioning portion would be closely pressed against the assembling component automatically due to the assembling component pressing down the supporting portion. Therefore, the user only needs to place the assembling component on the supporting portion to successfully complete the fixing of the assembling component by the fixing fixture, so as to facilitate the operation of the fixing fixture.

Several exemplary embodiments accompanied with figures are described in detail below to further explain the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
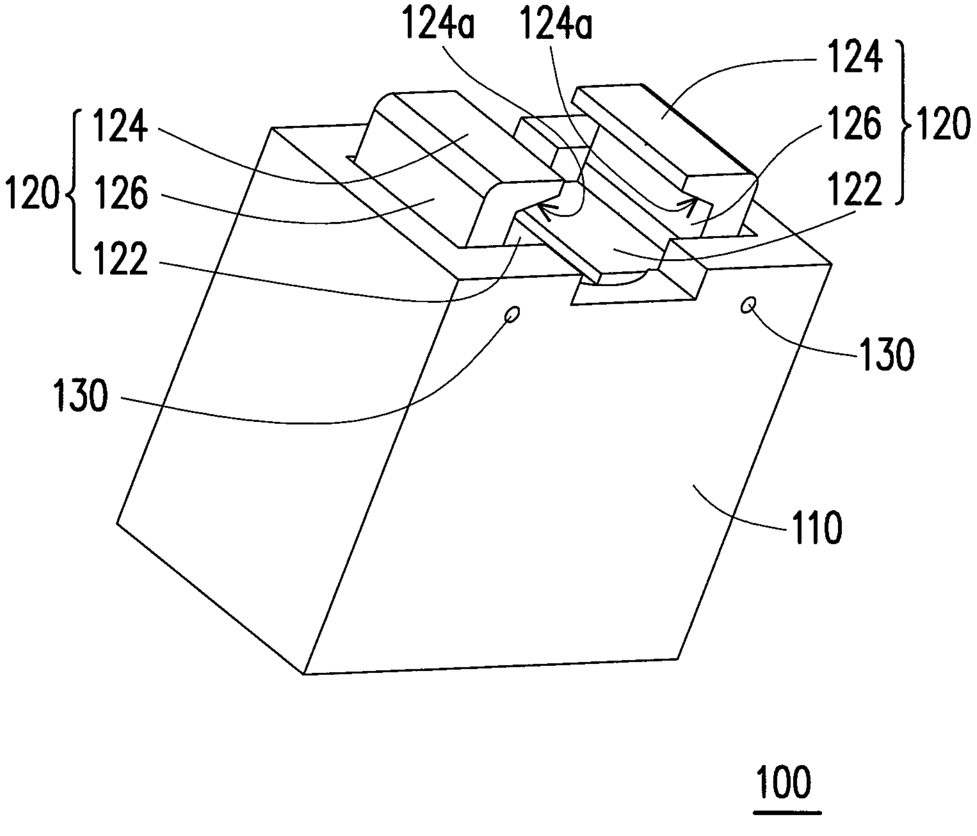
FIG. 1 is a three-dimensional view of a fixing fixture according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

Figure 2:
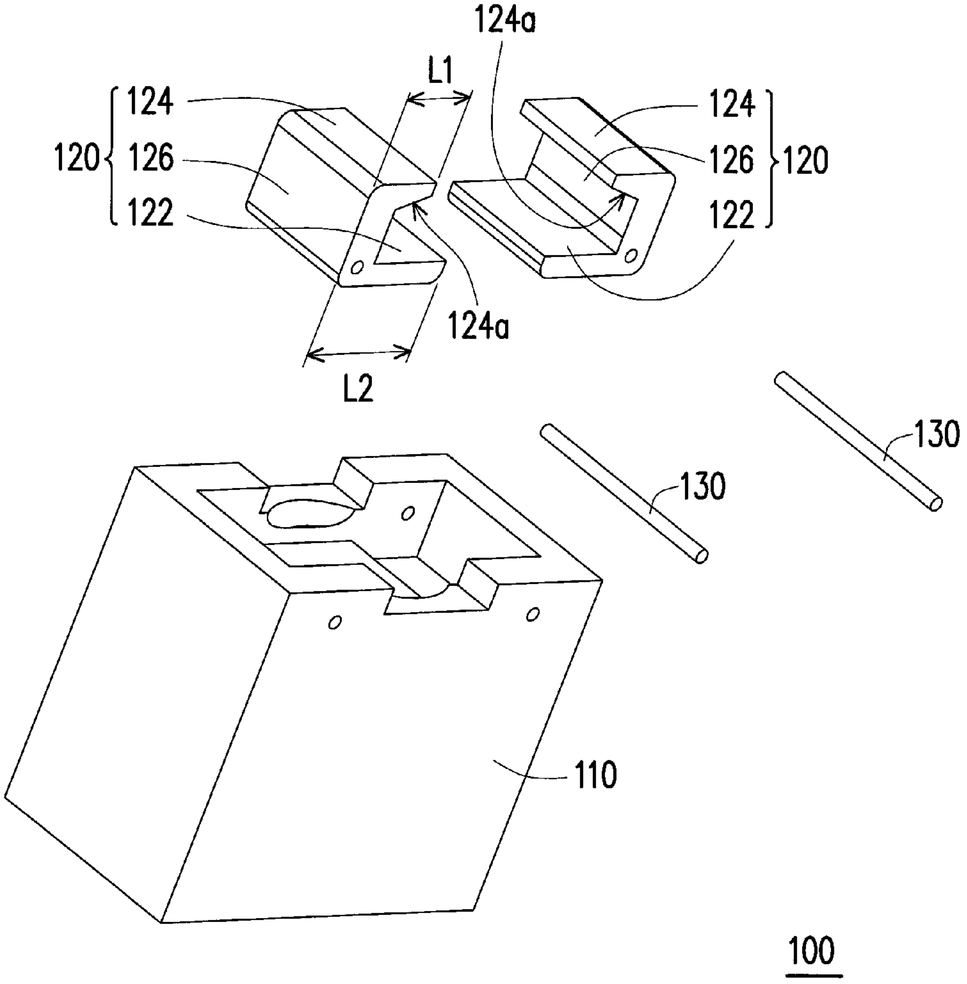
FIG. 2 is an explode view of the fixing fixture of FIG. 1.

FIG. 1 is a three-dimensional view of a fixing fixture according to an embodiment of the invention. FIG. 2 is an explode view of the fixing fixture of FIG. 1. Referring to FIG. 1 and FIG. 2, the fixing fixture 100 of the present embodiment includes a base 110, at least one positioning component 120 (two are shown) and at least one axle 130 (two are shown). The two positioning component 120 are pivoted with the base 110 by the two axles 130 respectively. Each of the positioning components 120 has a supporting portion 122, a positioning portion 124 and a connecting portion 126, and the connecting portion 126 is connected between the supporting portion 122 and the positioning portion 124.

Figure 3A:
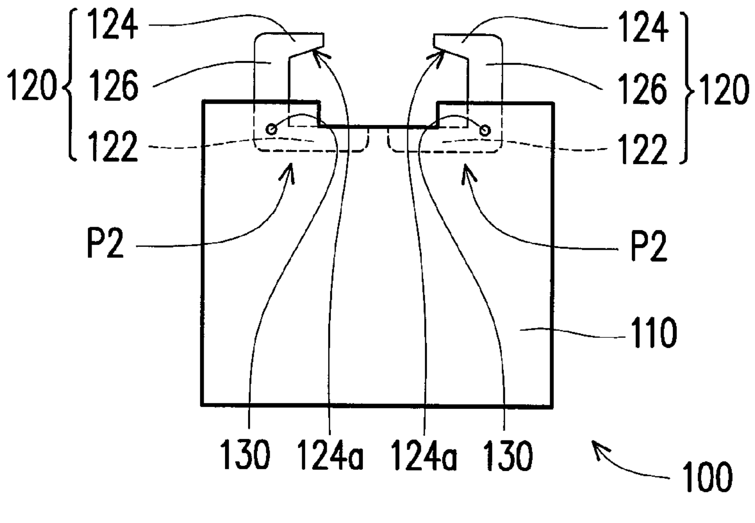
FIG. 3A to FIG. 3D are schematic diagrams illustrating an operation process of the fixing fixture of FIG. 1.
Figure 3B:
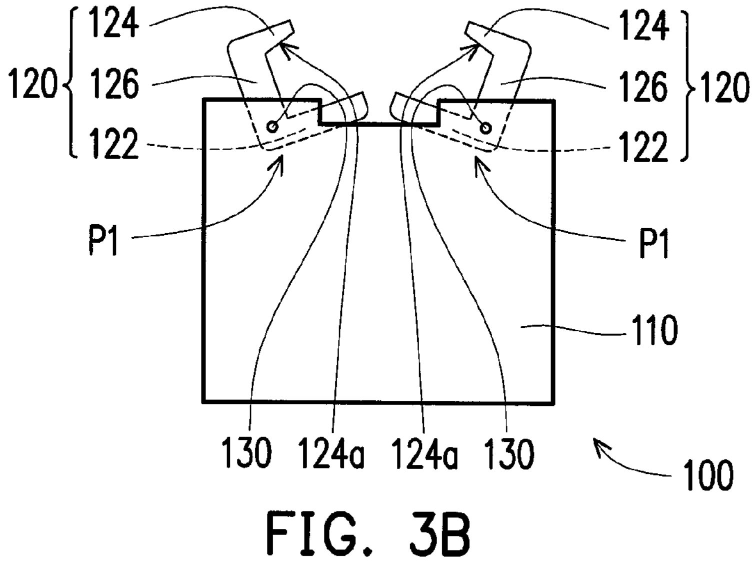
Figure 3C:
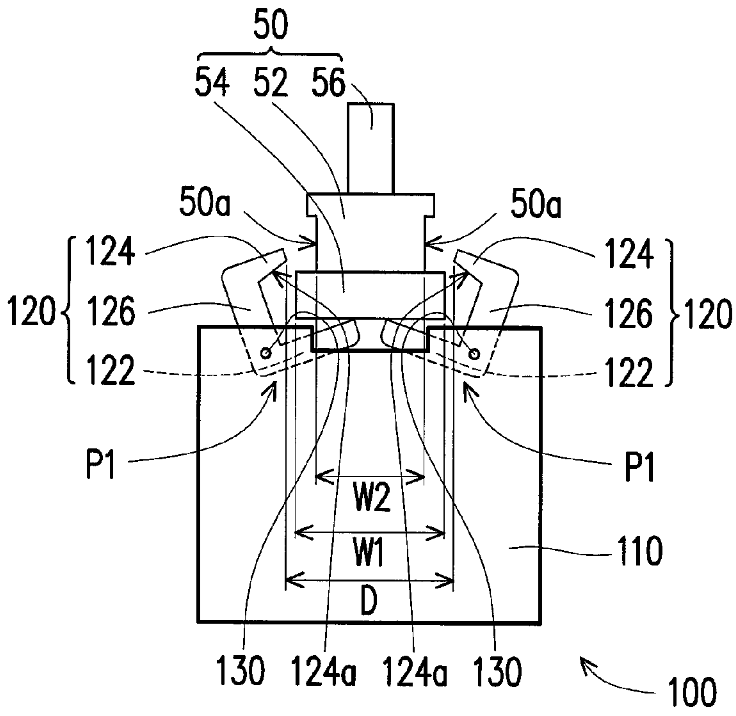
Figure 3D:
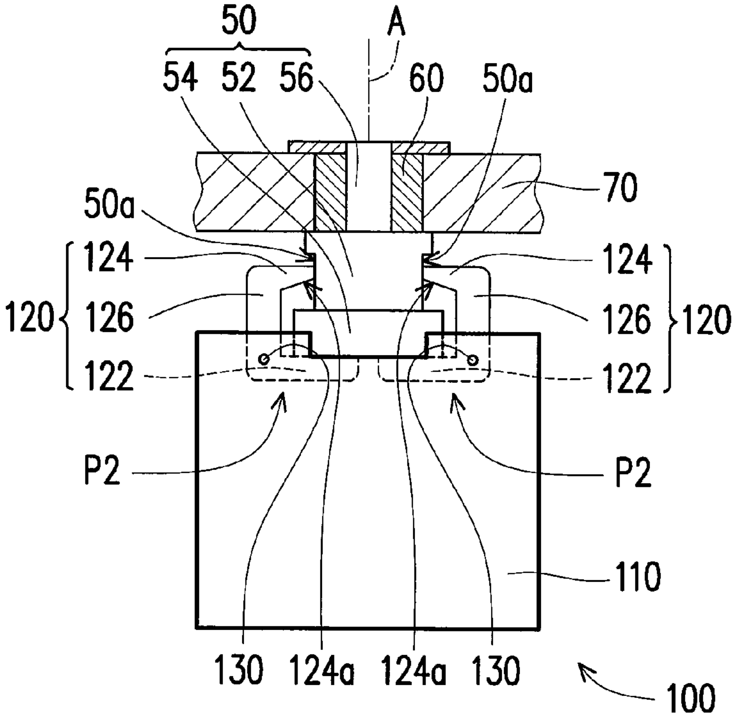

FIG. 3A to FIG. 3D are schematic diagrams illustrating an operation process of the fixing fixture of FIG. 1. When a user intends to fix an assembling component 50 (shown in FIG. 3C and FIG. 3D) by the fixing fixture 100, he/she can rotate each of the positioning components 120 from the second position P2 shown in FIG. 3A to the first position P1 shown in FIG. 3B first. When each of the positioning components 120 is located at the first position P1 as shown in FIG. 3B, the user can place the assembling component 50 on the supporting portion 122 of each of the positioning components 120 as shown in FIG. 3C. At this time, the assembling component 50 pushes the supporting portion 122 by the weight thereof so as to drive each of the positioning components 120 to rotate to the second position P2 as shown in FIG. 3D, such that the positioning portion 124 is closely pressed against the assembling component 50. When the positioning component 120 is located at the second position P2 and the positioning portion 124 is closely pressed against the assembling component 50, a fastening component 60 is adapted to rotate along an axis A to be fastened to the assembling component 50, so as to fix the assembling component 50 to the circuit board 70. During the process that the fastening component 60 rotates along the axis A and is fastened to the assembling component 50, the positioning portion 124 closely pressed against the assembling component 50 stops the assembling component 50 from rotating along the axis A with the fastening component 60, and the fastening can be successfully completed. The positioning portion 124 would be closely pressed against the assembling component 50 automatically due to the assembling component 50 pressing down the supporting portion 122. Therefore, the user only needs to place the assembling component 50 on the supporting portion 122 to successfully complete the fixing of the assembling component 50 by the fixing fixture 100, so as to facilitate the operation of the fixing fixture 100.

Figure 4:
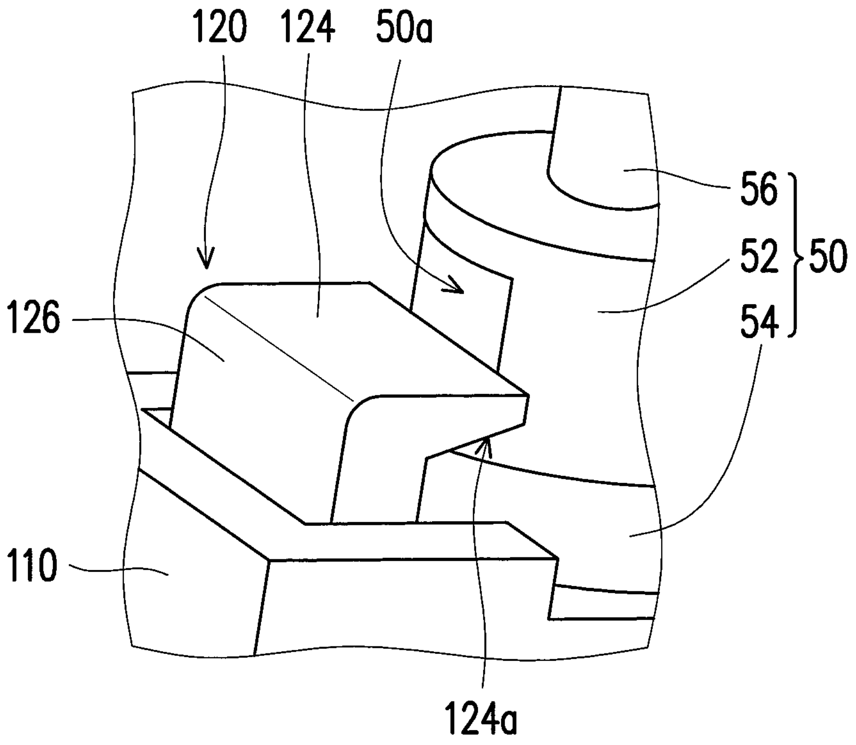
FIG. 4 is a partial three-dimensional view of the fixing fixture and the assembling component of FIG. 3D.

FIG. 4 is a partial three-dimensional view of the fixing fixture and the assembling component of FIG. 3D. Referring to FIG. 3D and FIG. 4, in the present embodiment, the assembling component 50 includes a main body 52, a first end portion 54 and a second end portion 56, and the first end portion 54 and the second end portion 56 are connected to two opposite ends of the main body 52 respectively. The first end portion 54 of the assembling component 50 is adapted to lean against the supporting portion 122 of each of the positioning components 120, the positioning portion 124 of each of the positioning components 120 is adapted to be closely pressed against the main body 52 of the assembling component 50, and the fastening component 60 is adapted to be fastened to the second end portion 56 of the assembling component 50. In addition, the main body 52 of the assembling component 50 has at least one interfering surface **50*a* (two are shown in FIG. 3D), and each of the interfering surfaces 50*a* is parallel to the axis A. When the assembling component 50 leans against the supporting portion 122 of each of the positioning component 120 as shown in FIG. 3D, the two positioning portions 124 are located at two opposite sides of the assembling component 50 respectively and are closely pressed against the two interfering surfaces 50*a* of the assembling component 50 respectively, so as to stop the assembling component 50** from rotating along the axis A.

In the present embodiment, a length L1 (shown in FIG. 2) of the positioning portion 124 is smaller than a length L2 (shown in FIG. 2) of the supporting portion 122, and the axle 130 is located at a border between the connecting portion 126 and the supporting portion 122 to be away from the positioning portion 124. According to the above-mentioned design, when each of the positioning components 120 rotates to the first position P1 as shown in FIG. 3C, a larger distance D is formed between the two positioning portions 124. The distance D is larger than a width W1 of the first end portion 54 of the assembling component 50, such that the first end portion 54 of the assembling component 50 can pass through a region between the two positioning portions 124 and move downward to lean against the two supporting portions 122.

In addition, in the present embodiment, the width W1 of the first end portion 54 is larger than a width W2 (shown in FIG. 3C) of the main body 52. When the positioning portion 124 of each of the positioning components 120 is closely pressed against the main body 52 of the assembling component 50 as shown in FIG. 3D, a part of the first end portion 54 is located between the supporting portion 122 and the positioning portion 124. Thus, when the user completes the fastening between the fastening component 60 and the assembling component 50 and intends to separate the assembling component 50 from the fixing fixture 100, he/she can move the assembled circuit board 70, fastening component 60 and assembling component 50 upward. At this time, the assembling component 50 receives a force and drives the first end portion 54 to move away from the supporting portion 122 and push the positioning portion 124, so as to drive each of the positioning components 120 to rotate from the second position P2 to the first position P1. When each of the positioning components 120 is located at the first position P1, a larger distance (distance D shown in FIG. 3C) is formed between the two positioning portions 124, therefore the assembling component 50 is able to pass through the region between the two positioning portions 124 successfully and move upward to be separated from the fixing fixture 100.

Further, in the present embodiment, the positioning portion 124 of each of the positioning components 120 has a guiding slope 124*a*. When the assembling component 50 moves upward to be away from the supporting portion 122, the first end portion 52 of the assembling component 50 pushes the guiding slope 124*a* of the positioning portion 124, so as to drive the positioning component 120 to rotate from the second position P2 to the first position P1 successfully by the guiding of the guiding slope 124*a*.

In summary, when the assembling component is placed on the supporting portion of the positioning component of the present invention, the positioning component will rotate from the first position to the second position due to the assembling component pressing down the supporting portion, such that the positioning portion of the positioning component is closely pressed against the assembling component to stop the assembling component from rotating. Thus, when a user is fastening the assembling component by the fastening component, the assembling component is prevented from rotating with the fastening component and the fastening of the assembling component can be completed successfully. As described above, the positioning portion would be closely pressed against the assembling component automatically due to the assembling component pressing down the supporting portion. Therefore, the user only needs to place the assembling component on the supporting portion to successfully complete the fixing of the assembling component by the fixing fixture, so as to facilitate the operation of the fixing fixture. In addition, when the user completes the fastening between the fastening component and the assembling component and intends to separate the assembling component from the fixing fixture, he/she can apply a force to the assembling component to drive the assembling component to move upward and push the positioning component from the second position to the first position, such that a larger distance is formed between the two positioning portions, therefore the assembling component is able to pass through the region between the two positioning portions successfully to be separated from the fixing fixture.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A fixing fixture, adapted to fix an assembling component, the fixing fixture comprising:

a base; and two positioning components, each of the positioning components is pivoted with the base and having a supporting portion and a positioning portion, wherein the positioning portion has a positioning surface, the positioning surface is a plane surface, when the positioning component is located at a first position, the supporting portion is adapted to be pushed by the weight of the assembling component to drive the positioning component to rotate to a second position, such that the two positioning portions move toward each other and are closely pressed against the assembling component, when each of the positioning components is located at the second position and the positioning surface is closely pressed against the assembling component, a fastening component is adapted to rotate along an axis to be fastened to the assembling component, and the positioning portion stops the assembling component from rotating along the axis with the fastening component.

2. The fixing fixture according to claim 1, wherein the assembling component has at least one interfering surface, the interfering surface is parallel to the axis, the positioning portion has at least another interfering surface, and the interfering surface of the positioning portion is adapted to closely pressed against the interfering surface of the assembling component to stop the assembling component from rotating along the axis.

3. The fixing fixture according to claim 1, wherein the assembling component comprises a main body, a first end portion and a second end portion, the first end portion and the second end portion are connected to two opposite ends of the main body respectively, the supporting portion has a supporting surface, the first end portion is adapted to lean against the supporting surface of the supporting portion, the positioning portion is adapted to be closely pressed against the main body, and the fastening component is adapted to be fastened to the second end portion.

4. The fixing fixture according to claim 3, wherein a width of the first end portion is larger than a width of the main body, the fixing fixture has a containing space between the supporting portion and the positioning portion, and when the positioning portion is closely pressed against the main body, a part of the first end portion is located in the containing space of the fixing fixture.

5. The fixing fixture according to claim 4, wherein the positioning portion has a pushed surface, when the part of the first end portion is located between the supporting portion and the positioning portion, the assembling component is adapted to receive a force to drive the first end portion to move away from the supporting portion and push the pushed surface of the positioning portion, such that each of the positioning components rotates from the second position to the first position.

6. The fixing fixture according to claim 5, wherein the pushed surface of the positioning portion is a guiding slope, and the first end portion is adapted to push the guiding slope to drive each of the positioning components to rotate from the second position to the first position.

7. The fixing fixture according to claim 1, wherein when the assembling component leans against the supporting portion, the two positioning portions are located at two opposite sides of the assembling component respectively.

8. The fixing fixture according to claim 7, wherein when each of the positioning components is located at the first position, a distance between the two positioning portions is larger than a width of the assembling component.

9. The fixing fixture according to claim 1, wherein a length of the positioning portion is smaller than a length of the supporting portion.

10. The fixing fixture according to claim 1, further comprising two axles, wherein the two positioning components are pivoted with the base through the axles.

11. The fixing fixture according to claim 10, wherein each of the positioning components further comprises a connecting portion, the connecting portion is connected between the supporting portion and the positioning portion, and the axle is located at a border between the connecting portion and the supporting portion.

* * * * *